(12) United States Patent
Shirai

(10) Patent No.: US 11,136,083 B2
(45) Date of Patent: Oct. 5, 2021

(54) BICYCLE TELESCOPIC APPARATUS

(71) Applicant: Shimano Inc., Sakai (JP)

(72) Inventor: Toyoto Shirai, Sakai (JP)

(73) Assignee: SHIMANO INC., Osaka (JP)

(*) Notice: Subject to any disclaimer, the term of this patent is extended or adjusted under 35 U.S.C. 154(b) by 201 days.

(21) Appl. No.: 15/419,851

(22) Filed: Jan. 30, 2017

(65) Prior Publication Data

US 2018/0079462 A1 Mar. 22, 2018

Related U.S. Application Data

(63) Continuation-in-part of application No. 15/269,986, filed on Sep. 20, 2016, now abandoned.

(51) Int. Cl.
| | | |
|---|---|---|
| B62J 1/08 | (2006.01) | |
| B62J 45/40 | (2020.01) | |
| B62K 25/08 | (2006.01) | |
| B62K 25/04 | (2006.01) | |
| B62M 6/60 | (2010.01) | |
| B62J 45/20 | (2020.01) | |

(52) U.S. Cl.
CPC ............ B62J 1/08 (2013.01); B62K 25/04 (2013.01); B62K 25/08 (2013.01); B62M 6/60 (2013.01); *B62J 45/20* (2020.02); *B62J 45/40* (2020.02); *B62J 2001/085* (2013.01); *B62K 2025/044* (2013.01); *B62K 2025/045* (2013.01); *B62K 2204/00* (2013.01)

(58) Field of Classification Search
CPC ............ B62J 1/08; B62J 2001/085; B62J 2300/0013; B62J 45/40; B62J 45/41; B62J 45/42; B62K 25/04; B62K 2207/00; B62K 2204/00; B62K 2025/044

See application file for complete search history.

(56) References Cited

U.S. PATENT DOCUMENTS

| | | | | |
|---|---|---|---|---|
| 7,083,180 | B2 | 8/2006 | Turner | |
| 8,091,910 | B2* | 1/2012 | Hara | B62J 99/00 |
| | | | | 280/283 |
| 8,825,322 | B1* | 9/2014 | Ikemoto | B62M 25/08 |
| | | | | 701/60 |
| 2003/0197504 | A1* | 10/2003 | Gray | F15B 15/2861 |
| | | | | 324/207.24 |
| 2010/0219814 | A1* | 9/2010 | Nishiura | B66B 1/3492 |
| | | | | 324/207.24 |
| 2011/0204201 | A1 | 8/2011 | Kodama et al. | |

(Continued)

FOREIGN PATENT DOCUMENTS

| | | |
|---|---|---|
| DE | 102012012532 A1 | 1/2014 |
| EP | 2457811 A1 | 5/2012 |

(Continued)

*Primary Examiner* — Anne Marie M Boehler

(57) ABSTRACT

A bicycle telescopic apparatus includes a first tube having a receiving space, a second tube telescopically received in the receiving space of the first tube, a position detector configured to detect a relative position between the first tube and the second tube in a longitudinal direction of the bicycle telescopic apparatus, and an output device configured to output a signal based on a detected result of the position detector. The signal can control a bicycle component other than the bicycle telescopic apparatus. A detecting point of the position detector is located in the receiving space of the first tube.

11 Claims, 10 Drawing Sheets

FIG. 3

(56) References Cited

U.S. PATENT DOCUMENTS

| | | | |
|---|---|---|---|
| 2012/0274043 A1 | 11/2012 | Lee et al. | |
| 2013/0221713 A1 | 8/2013 | Pelot et al. | |
| 2013/0341138 A1 | 12/2013 | Battlogg et al. | |
| 2014/0062056 A1* | 3/2014 | Battlogg | B62K 25/08 280/276 |
| 2015/0137478 A1* | 5/2015 | Shirai | B62K 25/08 280/283 |

FOREIGN PATENT DOCUMENTS

| | | | |
|---|---|---|---|
| EP | 2757030 A1 | 7/2014 |
| EP | 2865586 A1 | 4/2015 |
| EP | 2886428 A1 | 6/2015 |

* cited by examiner

BICYCLE TELESCOPIC APPARATUS

BACKGROUND OF THE INVENTION

The invention generally relates to bicycles, and more particularly to telescopic apparatuses on bicycles such as adjustable seatposts or adjustable suspensions.

When riding a bicycle, and in particular, when riding a mountain bike, it is sometimes desirable to adjust the seat position. For example, when climbing a hill, riders often prefer a raised seat position. When descending, riders often prefer a lower seat position. In bicycles with adjustable, telescopic seatposts, it may be useful to detect the seat position, so that other bicycle components can be adjusted in accordance with the seat position. Similarly, it is sometimes desirable to adjust the position of a telescopic bicycle suspension, and it may be useful to detect the suspension position so that other bicycle components can be adjusted in accordance with the position of the suspension.

SUMMARY OF THE INVENTION

In a first aspect of the invention, a bicycle telescopic apparatus includes a first tube having a receiving space; a second tube telescopically received in the receiving space of the first tube; a position detector configured to detect a relative position between the first tube and the second tube in a longitudinal direction of the bicycle telescopic apparatus, wherein a detecting point of the position detector is located in the receiving space of the first tube; and an output device configured to output a signal based on a detected result of the position detector. The signal is configured to control a bicycle component other than the bicycle telescopic apparatus.

With the bicycle telescopic apparatus according to the first aspect, it is possible to appropriately control another bicycle component in accordance with a relative position between a first tube and a second tube.

In a second aspect of the invention, in the bicycle telescopic apparatus according to the first aspect, the position detector includes a first detector part and a second detector part, the first detector part is located on one of the first tube and the second tube, and the second detector part is located on the other of one of the first tube and the second tube.

With the bicycle telescopic apparatus according to the second aspect, it is possible to effectively detect a relative position between the first tube and the second tube.

In a third aspect of the invention, in the bicycle telescopic apparatus according to the second aspect, one of the first detector part and the second detector part has an elongated shape extending in the longitudinal direction.

With the bicycle telescopic apparatus according to the third aspect, it is possible to effectively detect a plurality of relative positions between the first tube and the second tube in the longitudinal direction.

In a fourth aspect of the invention, in the bicycle telescopic apparatus according to any one of the second and third aspects, the second tube includes a seal located on an outer surface of the second tube, and the second detector part is located between the seal and a receiving opening of the first tube.

With the bicycle telescopic apparatus according to the fourth aspect, it is possible to widely detect a relative position between the first tube and the second tube in the longitudinal direction.

In a fifth aspect of the invention, in the bicycle telescopic apparatus according to any one of the second to fourth aspects, one of the first detector part and the second detector part is located on an inner surface of the first tube.

With the bicycle telescopic apparatus according to the fifth aspect, it is possible to appropriately locate one of the first detector part and the second detector part.

In a sixth aspect of the invention, in the bicycle telescopic apparatus according to the fifth aspect, the one of the first detector part and the second detector part is located in a groove formed on the inner surface of the first tube.

With the bicycle telescopic apparatus according to the sixth aspect, it is possible to appropriately position one of the first detector part and the second detector part and to avoid interfering with relative movement between the first tube and the second tube.

In a seventh aspect of the invention, in the bicycle telescopic apparatus according to any of the previous aspects, the bicycle component includes at least one of a bicycle suspension, a bicycle drive unit and a bicycle shifting device.

With the bicycle telescopic apparatus according to the seventh aspect, it is possible to appropriately control one of the bicycle suspension, the bicycle drive unit and the bicycle shifting device in accordance with the relative position between the first tube and the second tube.

In an eighth aspect of the invention, in the bicycle telescopic apparatus according to any of the previous aspects, the output device is located on an end of the first tube or an end of the second tube.

With the bicycle telescopic apparatus according to the eighth aspect, it is possible to make the bicycle telescopic apparatus compact and to easily and electrically connect the bicycle telescopic apparatus to the other bicycle component.

In a ninth aspect of the invention, in the bicycle telescopic apparatus according to any of the previous aspects, the output device includes a wireless unit configured to wirelessly output the signal.

With the bicycle telescopic apparatus according to the ninth aspect, it is possible to omit electrical wiring on the bicycle.

In a tenth aspect of the invention, the bicycle telescopic apparatus according to any of the previous aspects further comprises at least one of an electrical cable port and an electrical cable, which is configured to be electrically connected to the bicycle component.

With the bicycle telescopic apparatus according to the tenth aspect, it is possible to electrically connect a bicycle telescopic apparatus to the other bicycle component via an electrical cable.

In an eleventh aspect of the invention, the bicycle telescopic apparatus according to any of the previous aspects further comprises a positioning structure configured to relatively position the first tube and the second tube, and the output device is configured to output the signal to control the positioning structure.

With the bicycle telescopic apparatus according to the eleventh aspect, it is possible to automatically control the relative position between the first tube and the second tube.

In a twelfth aspect of the invention, in the bicycle telescopic apparatus according to the eleventh aspect, the positioning structure includes a motor and a hydraulic unit including a valve to switch between an open state and a closed state of the hydraulic unit, and the motor is configured to actuate the valve in accordance with the signal.

With the bicycle telescopic apparatus according to the twelfth aspect, it is possible to automatically control the relative position between the first tube and the second tube.

In a thirteenth aspect of the invention, in the bicycle telescopic apparatus according to any of the previous aspects, the bicycle telescopic apparatus is a height-adjustable seatpost assembly.

With the bicycle telescopic apparatus according to the thirteenth aspect, it is possible to appropriately control the other bicycle component in accordance with the seat position of the height-adjustable seatpost assembly.

In a fourteenth aspect of the invention, in the bicycle telescopic apparatus according to any of the previous aspects, the bicycle telescopic apparatus is a suspension apparatus.

With the bicycle telescopic apparatus according to the fourteenth aspect, it is possible to appropriately control the other bicycle component in accordance with telescopic movement of the suspension apparatus.

In a fifteenth aspect of the invention, a bicycle telescopic apparatus control system includes a controller configured to control a positioning structure to relatively position a first tube and a second tube of a bicycle telescopic apparatus in accordance with a signal. The signal includes information related to a relative position of the first tube and the second tube in a longitudinal direction of the bicycle telescopic apparatus. The bicycle telescopic apparatus control system further includes a position detector including a first detector part and a second detector part. The first detector part is located on one of the first tube and the second tube, and the second detector part is located on the other of the first tube and the second tube. One of the first detector part and the second detector part has a longitudinal maximum length and a transverse maximum length that is smaller than the longitudinal maximum length. The longitudinal maximum length is measured along the longitudinal direction of the bicycle telescopic apparatus, and the transverse maximum length is measured along a transverse direction perpendicular to the longitudinal direction.

With the bicycle telescopic apparatus control system according to the fifteenth aspect, it is possible to effectively detect a plurality of relative positions between the first tube and the second tube in the longitudinal direction.

In a sixteenth aspect of the invention, a bicycle telescopic apparatus includes a first tube having a receiving space; a second tube telescopically received in the receiving space of the first tube to be adjustably movable with respect to the first tube in a longitudinal direction of the bicycle telescopic apparatus; a hydraulic positioning structure configured to adjustably position the first tube and the second tube in the longitudinal direction, wherein the hydraulic positioning structure includes a hydraulic valve to open and close a hydraulic passage; an electrical actuator configured to actuate the hydraulic positioning structure to close the hydraulic valve in accordance with a closing signal; and a position detector configured to output the closing signal in response to a telescopic movement of the second tube toward a predetermined position relative to the first tube.

With the bicycle telescopic apparatus according to the sixteenth aspect, it is possible to have a simply constructed bicycle telescopic apparatus.

In a seventeenth aspect of the invention, in a bicycle telescopic apparatus according to the sixteenth aspect, the position detector includes a first detector part located on one of the first and second tubes, and a second detector part located on the other of the first and second tubes.

With the bicycle telescopic apparatus according to the seventeenth aspect, it is possible to have alternative positions of the first and second detector parts of the position detector.

In an eighteenth aspect of the invention, in a bicycle telescopic apparatus according to the seventeenth aspect, one of the first detector part and the second detector part includes a switch to output the closing signal, and the other of the first detector part and the second detector part is configured to actuate the switch.

With the bicycle telescopic apparatus according to the eighteenth aspect, it is possible to have a simple switch to be actuated.

In a nineteenth aspect of the invention, a bicycle telescopic apparatus according to any one of the seventeenth aspect and the eighteenth aspect, a detecting point of the position detector defined between the first detector part and the second detector part is located in the receiving space.

With the bicycle telescopic apparatus according to the nineteenth aspect, it is possible to have a compact design.

In a twentieth aspect of the invention, in a bicycle telescopic apparatus according to any one of the seventeenth aspect to the nineteenth aspect, at least one of the first detector part and the second detector part is detachable from the bicycle telescopic apparatus.

With the bicycle telescopic apparatus according to the twentieth aspect, it is possible to provide the user the ability to remove at least a portion of the position detector. Therefore, it is possible to selectively make a position detector inactive by removing the one of the first detector part and the second detector part.

In a twenty-first aspect of the invention, a bicycle telescopic apparatus according to any one of the seventeenth aspect to the twentieth aspect further includes an adjustment structure configured to adjust a longitudinal position of at least one of the first detector part and the second detector part so that the detecting point is selectively changed in the longitudinal direction.

With the bicycle telescopic apparatus according to the twenty-first aspect, it is possible to provide adjustability to the detecting point In a twenty-second aspect of the invention, in a bicycle telescopic apparatus according to the twenty-first aspect, the at least one of the first detector part and the second detector part is mounted to the first tube.

With the bicycle telescopic apparatus according to the twenty-second aspect, it is possible to have a secure mounting for at least a part of the position detector.

In a twenty-third aspect of the invention, in a bicycle telescopic apparatus according to the twenty-second aspect, the adjustment structure is accessible from an outside of the first tube to adjust the longitudinal position of the at least one of the first detector part and the second detector part.

With the bicycle telescopic apparatus according to the twenty-third aspect, it is possible to provide an ease of adjustability.

In a twenty-fourth aspect of the invention, in a bicycle telescopic apparatus according to any one of the sixteenth aspect to the twenty-third aspect, the position detector is configured to be selectively changed between an activated state, in which the position detector is capable of outputting the closing signal and an inactivated state, in which the position detector is incapable of outputting the closing signal.

With the bicycle telescopic apparatus according to the twenty-fourth aspect, it is possible to provide a simpler communication between the parts of the bicycle telescopic apparatus.

In a twenty-fifth aspect of the invention, in a bicycle telescopic apparatus according to any one of the sixteenth aspect to the twenty-fourth aspect, the electrical actuator is configured to actuate the hydraulic positioning structure to open the hydraulic valve in accordance with a first opening signal that is based on a first state of a user operating device, and the electrical actuator is configured to close the hydraulic passage in accordance with the closing signal in a state in which the electrical actuator has opened the hydraulic passage in accordance with the first opening signal.

With the bicycle telescopic apparatus according to the twenty-fifth aspect, it is possible to provide user activation.

In a twenty-sixth aspect of the invention, in a bicycle telescopic apparatus according to the twenty-fifth aspect, the electrical actuator is configured to actuate the hydraulic positioning structure to open the hydraulic valve in accordance with a second opening signal that is based on a second state of the user operating device, and the electrical actuator is configured to keep the hydraulic passage open in a state that the hydraulic passage has been opened in accordance with the second opening signal.

With the bicycle telescopic apparatus according to the twenty-sixth aspect, it is possible to provide user activation.

In a twenty-seventh aspect of the invention, in a bicycle telescopic apparatus according to any one of the sixteenth aspect to the twenty-sixth aspect, the position detector is configured to wirelessly output the closing signal.

With the bicycle telescopic apparatus according to the twenty-seventh aspect, it is possible to remove potential wire chaffing.

In a twenty-eighth aspect of the invention, in a bicycle telescopic apparatus according to any one of the sixteenth aspect to the twenty-seventh aspect, the position detector is connected to the electrical actuator via an electrical cable.

With the bicycle telescopic apparatus according to the twenty-eighth aspect, it is possible to have a secure line of communication.

In a twenty-ninth aspect of the invention, in a bicycle telescopic apparatus includes: a first tube having a receiving space; a second tube telescopically received in the receiving space of the first tube to be adjustably movable with respect to the first tube in a longitudinal direction of the bicycle telescopic apparatus; a positioning structure configured to adjustably position the first tube and the second tube in the longitudinal direction of the bicycle telescopic apparatus; a position detector configured to detect a relative position between the first tube and the second tube in the longitudinal direction, wherein a detecting point of the position detector is located in the receiving space of the first tube, and the position detector outputs a signal related to the relative position between the first and second tubes in response to a telescopic movement of the second tube toward a predetermined position relative to the first tube, and an adjustment structure configured to adjust a longitudinal position of the position detector so that the predetermined position is selectively changed in the longitudinal direction.

With the bicycle telescopic apparatus according to the twenty-ninth aspect, it is possible to provide other ways to telescopically adjust the tubes in the longitudinal direction.

Other advantages and features of the present invention will become apparent to those skilled in the art from the following detailed description and the drawings.

DESCRIPTION OF THE EMBODIMENTS

Selected embodiments of the present invention will now be described with reference to the accompanying drawings. It will be apparent to those skilled in the art from this disclosure that the following description of various embodiments of the invention is provided for illustration only and not for the purpose of limiting the invention as defined by the appended claims and their equivalents.

Figure 1:
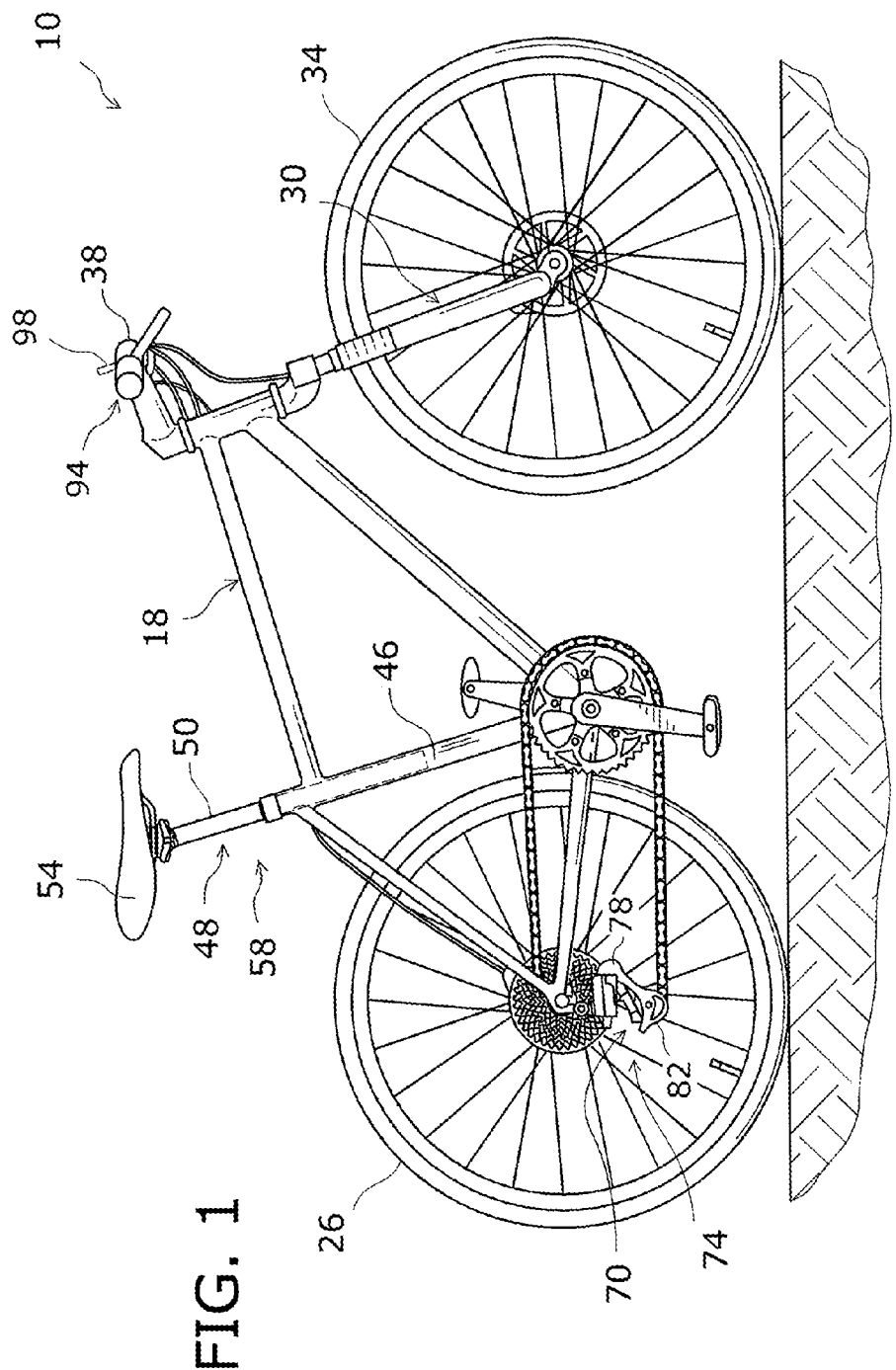
FIG. 1 is a side elevation view of a bicycle according to at least one embodiment of the present invention.

Referring initially to FIG. 1, an exemplary bicycle 10 according to at least one disclosed embodiment of the present invention is shown. The bicycle 10 includes a frame 18 attached to a rear wheel 26. A front fork 30, which comprises a bicycle suspension 86 (described later), attaches a front wheel 34 to the frame 18. A handlebar 38 is attached to the frame 18. The frame 18 includes a seat tube 46, which receives a height-adjustable seatpost assembly 48. The height-adjustable seatpost assembly 48 includes a seatpost 50 to which a seat 54 is attached. In the embodiment of FIG. 1, the height-adjustable seatpost assembly 48 is shown as an example of a bicycle telescopic apparatus 58.

The bicycle 10 includes a bicycle component 70. In the embodiment of FIG. 1, the bicycle component 70 is a bicycle shifting device 74. In the case of the embodiment of FIG. 1, the bicycle shifting device 74 is a motorized rear derailleur 78, which includes a movable chain guide 82 and a motor (not shown) that actuates the movable chain guide 82. The bicycle 10 can include a telescopic apparatus operating device 98 and a component operating device 94 mounted, for example, on the handlebar 38, where they can be manipulated by a rider. The telescopic apparatus operating device 98 controls the bicycle telescopic apparatus 58, and the component operating device 94 controls the bicycle component 70. Other parts of the bicycle 10 are well known and are not described herein.

Figures 2, 3:
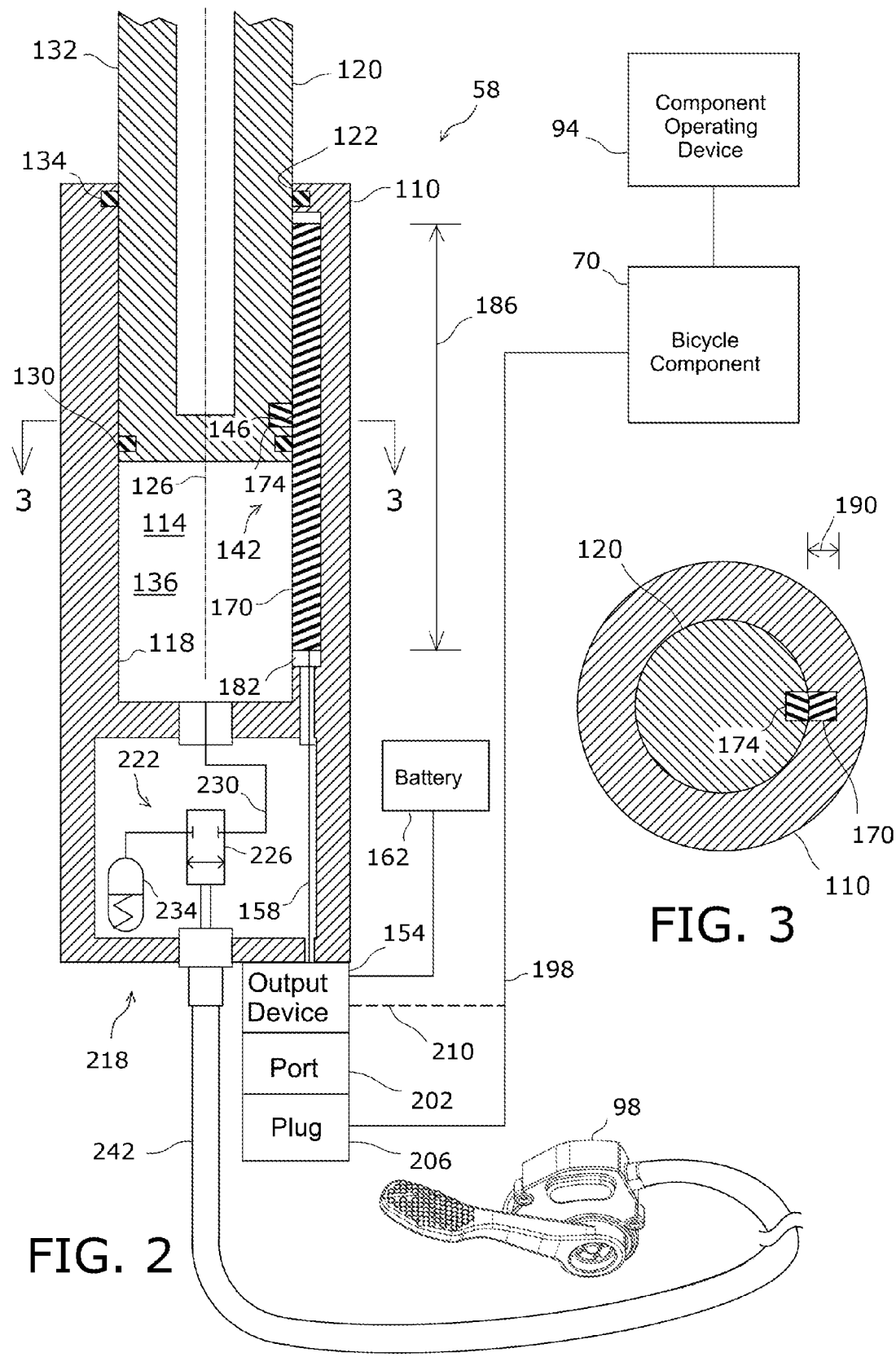
FIG. 2 is a schematic diagram of a bicycle telescopic apparatus.
FIG. 3 is a schematic cross sectional diagram taken along the plane 3-3 in FIG. 2.

FIG. 2 schematically illustrates the bicycle telescopic apparatus 58. The bicycle telescopic apparatus 58 includes a first tube 110 having a receiving space 114 and a second tube 120, which is telescopically received in the receiving space 114 of the first tube 110. The first tube 110 has a proximal end and a distal end, which is opposite to the proximal end in a longitudinal direction of the first tube 110. The distal end of the first tube 110 is a lower end when the height-adjustable seatpost assembly 48 is received in the seat tube 46. The first tube 110 has a receiving opening 122 into which the second tube 120 is inserted during assembly, and an inner surface 118. The receiving opening 122 is located at the proximal end of the first tube 110. The first tube 110 and the second tube 120 can slide relative to one another in a longitudinal, or axial, direction, which is defined by a longitudinal center axis 126. Thus, the first tube 110 functions as a cylinder and the second tube 120 functions as a piston. However, in some embodiments, the first tube 110 and the second tube 120 cannot slide relative to one another unless the bicycle telescopic apparatus 58 is in an unlocked state as discussed further below. Depending on the application, as described below, one of the first tube 110 and the second tube 120 can be fixed with respect to the frame 18. The first tube 110 and the second tube 120 are preferably made of rigid material such as steel or aluminum alloy.

A seal 130 is fitted to an outer surface 132 of the second tube 120. A chamber 136 is formed in the receiving space 114 between the first tube 110 and the second tube 120, and the chamber 136 is sealed by the seal 130. The seal 130 is annular and is formed of resilient material such as rubber. Other seals, such as a dust seal 134, for example, can be employed to prevent dust from entering the receiving space 114.

A position detector 142 is configured to detect a relative position between the first tube 110 and the second tube 120 in the longitudinal direction of the bicycle telescopic apparatus 58. A detecting point 146 of the position detector 142 is located in the receiving space 114 of the first tube 110. In other words, the position detector 142 is configured to detect the longitudinal position of one of the first tube 110 and the second tube 120 with respect to the other. The detecting point 146 is a point on one of the first tube 110 and the second tube 120 to determine the relative positional relationship between the first tube 110 and the second tube 120 longitudinally.

Further, the bicycle telescopic apparatus 58 includes an output device 154 configured to output a signal based on a detected result of the position detector 142. The output device 154 is electrically coupled to the position detector 142 by a detector wire 158. The output device 154 can be integrally formed with the position detector 142. As a power source, a battery 162, for example, can be coupled to the output device 154 and the position detector 142, which may include CPU (central processing unit). The output device 154 can read relative position information from the position detector 142 and can output that information as a signal to, for example, the bicycle component 70. The output device 154 can include an analog to digital converter depending on the type of the position detector 142. That is, if the position detector 142 produces an analog signal, the output device 154 can convert the signal from the position detector 142 to a digital signal. The output device 154 can include memory for storing programs and data and a CPU for processing the position information read from the position detector 142. The output device 154 can include additional programs for performing tasks such as calibrating the position detector 142. Further, the output device 154 can include a network interface if a communication network is employed on the bicycle 10.

The signal is configured to control a bicycle component 70 other than the bicycle telescopic apparatus 58. That is, the signal output from the output device 154 is configured to provide data related to the relative position of the first tube 110 and the second tube 120 to another bicycle component 70, which permits the bicycle component 70 to be controlled based on the position of the bicycle telescopic apparatus 58 in addition to the component operating device 94. In the embodiment of FIG. 1, in which the height-adjustable seatpost assembly 48 includes the bicycle telescopic apparatus 58, the bicycle component 70 can be controlled based on the seat position. In the embodiment of FIG. 1, the bicycle component 70 is the motorized rear derailleur 78. Various other bicycle components can be controlled based on the signal, as described further below.

Referring to FIG. 2, the position detector 142 includes a first detector part 170 and a second detector part 174. The first detector part 170 is located on one of the first tube 110 and the second tube 120, and the second detector part 174 is located on the other of the first tube 110 and the second tube 120. The detecting point 146 is, for example, defined as a point of connection between the first detector part 170 and the second detector part 174. Therefore, in this embodiment, the detecting point 146 is defined as a point of contact between the first detector part 170 and the second detector part 174. However, the point of connection between the first detector part 170 and the second detector part 174 is not limited to a point of direct contact. For example, if the position detector 142 includes a magnetostrictive linear sensor, the connecting point includes a gap between the first detector part 170 and the second detector part 174. In the embodiment illustrated in FIG. 2, the first detector part 170 is located on the first tube 110 and the second detector part 174 is located on the second tube 120; however, this arrangement can be reversed. One of the first detector part 170 and the second detector part 174 has an elongated shape extending in the longitudinal direction. In the embodiment illustrated in FIG. 2, the first detector part 170 has the elongated shape, the longitudinal direction of which is parallel to the longitudinal center axis 126. In the embodiment of FIG. 2, the second detector part 174 is located between the seal 130 and the receiving opening 122 of the first tube 110 in the longitudinal direction. Further, in the embodiment of FIG. 2, the second detector 174 is located on an outer surface 132 of the second tube 120. However, it is possible to locate the second detector part 174 at other locations.

The position detector 142 can be any of several known linear position sensors. For example, in the embodiment of FIG. 2, the position detector 142 includes a potentiometer. The first detector part 170 includes an elongated variable resistance member, and the second detector part 174 includes a sliding element, or brush, that makes electrical contact with the variable resistance member. The location of the brush with respect to the elongated resistance member can be determined in a known manner. Similarly, a digital potentiometer, which mimics an analog potentiometer, can be employed. In addition, a magnetostrictive linear sensor can be employed as the position detector 142. In this case, the first detector part 170 is a waveguide member, and the second detector is a magnet. The relative position between the magnet and the waveguide member can be determined in a known manner. In a magnetostrictive linear sensor, contact between the first detector part 170 and the second detector part 174 is not required.

One of the first detector part 170 and the second detector part 174 is located on the inner surface 118 of the first tube 110. In the embodiment shown in FIG. 2 and FIG. 3, the first detector part 170, which is the elongated part in this embodiment, is located on the inner surface 118 of the first tube 110, and the second detector part 174 radially faces the first detector part 170. However, the one of the first detector part 170 and the second detector part 174 that has an elongated shape can be located on the inner surface of the second tube 120, if needed and/or desired.

Referring to FIG. 2 and FIG. 3, the one of the first detector part 170 and the second detector part 174 is located in a groove 182 formed on the inner surface 118 of the first tube 110. Preferably, the one of the first detector part 170 and the second detector part 174 that is located in the groove 182 is sealed in the groove 182 so that the groove 182 does not interfere with the sealing of the chamber 136, as shown in FIG. 3. For example, if the position detector 142 is a potentiometer, the elongated part of the position detector 142 can be embedded in resin such that only parts that make electrical contact are exposed. As shown in FIG. 3, the facing surfaces of the first detector part 170 and the second detector part 174 conform to the circular shapes of the first tube 110 and the second tube 120. The groove 182 of this embodiment can be omitted, if needed and/or desired.

Referring to FIGS. 2 and 3, one of the first detector part 170 and the second detector part 174 has a longitudinal maximum length 186 and a transverse maximum length 190 that is smaller than the longitudinal maximum length 186. The longitudinal maximum length 186 is measured along the longitudinal direction of the bicycle telescopic apparatus 58. The transverse maximum length 190 is measured along a transverse direction perpendicular to the longitudinal direction.

Figure 4:
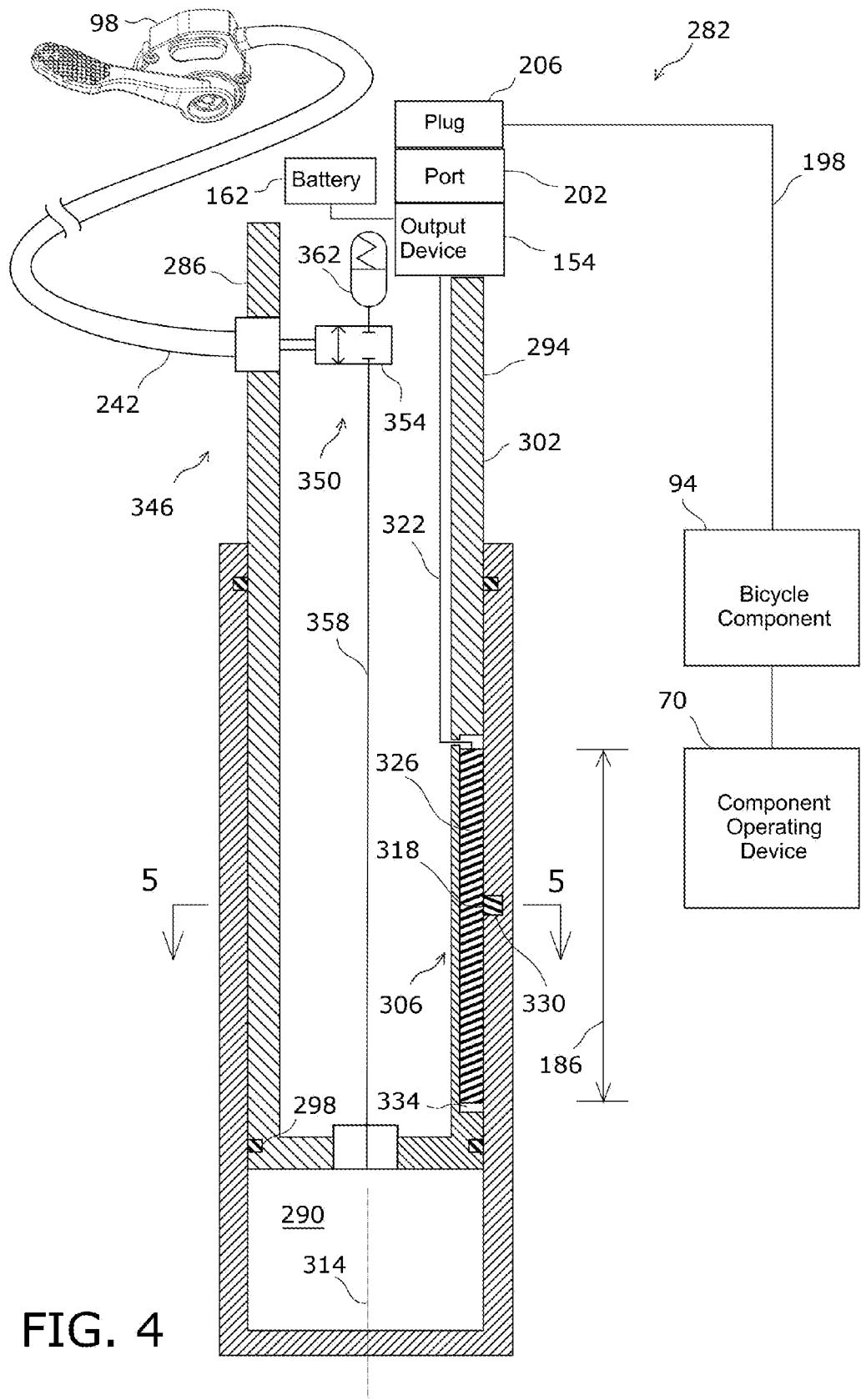
FIG. 4 is a schematic diagram of a bicycle telescopic apparatus according to a further embodiment.

The output device 154 is located on an end of the first tube 110 or an end of the second tube 120. In the embodiment illustrated in FIG. 2, the output device 154 is located on a lower end of the first tube 110. However, the output device 154 can be located on the opposite end of the first tube 110. In such a case, the output device 154 can be located on an outer surface of the first tube 110. In addition, the output device 154 can be located on an end of the second tube 120 as shown in the embodiment of FIG. 4. Further, the bicycle telescopic apparatus 58 of FIG. 2 can be inverted so that the first tube 110 is at the upper end and the second tube 120 is at the lower end of the bicycle telescopic apparatus 58.

The bicycle telescopic apparatus 58 further includes at least one of an electrical cable port 202 and an electrical cable 198, which is configured to be electrically connected to the bicycle component 70. In the embodiment of FIG. 2, an electrical cable 198 is connected to the output device 154 through the cable port 202; however, the cable port 202 can be omitted and the electrical cable 198 can be connected directly to the output device 154 as shown by the broken line 210 extending from the output device 154 in FIG. 2. The cable port 202 is a quick-connect coupler such as a standardized socket, which makes connecting the electrical cable 198 to the output device 154 fast and simple. In this case, the end of the electrical cable 198 that connects to the output device 154 can be connected to a mating plug 206 that fits the cable port 202.

The bicycle telescopic apparatus 58 of FIG. 2 can include a positioning structure 218 to relatively position the first tube 110 and the second tube 120. The positioning structure 218 can include a hydraulic unit 222, for example, as shown schematically in FIG. 2. The hydraulic unit 222 can be located in at least one of the first tube 110 and the second tube 120. In the bicycle telescopic apparatus 58 of FIG. 2, the chamber 136 is filled with non-compressible fluid such as hydraulic fluid, which can be oil, for example. A valve 226 is located in a hydraulic line 230 between the chamber 136 and an accumulator 234. When the valve 226 is in a closed state, as shown in FIG. 2, the first tube 110 and second tube 120 cannot move with respect to one another. However, when the valve 226 is in an open state, hydraulic fluid is allowed to flow between the chamber 136 and the accumulator 234, and the first tube 110 and the second tube 120 can move relative to one another, which allows the relative positional relationship between the first tube 110 and the second tube 120 to be adjusted.

The telescopic apparatus operating device 98 can be mechanically coupled to the valve 226, as shown in FIG. 2. Manipulation of the telescopic apparatus operating device 98 causes the valve 226 to open and close according to the needs of the rider. The telescopic apparatus operating device 98 can be mounted on the handlebar 38, for example. For example, as illustrated in FIG. 2, a Bowden cable 242 can be used to mechanically couple the telescopic apparatus operating device 98 and the valve 226. Alternatively, an electric motor can be coupled to the valve 226 to cause the valve 226 to open and close. In such a configuration, the electric motor can be operated by electrical signal emitted by an electric switch unit. The electric switch unit can emit the electrical signal to a controller to control the electric motor, via wireless communication or wired communication. Other known positioning structures can be employed to lock and release the bicycle telescopic apparatus 58. For example, a ratchet mechanism, which is released or engaged by the telescopic apparatus operating device 98, can be employed to lock and release the bicycle telescopic apparatus 58, and a mechanical spring can be provided to urge the bicycle telescopic apparatus 58 in a longitudinal direction. Further, a motor-driven positioning mechanism can be employed to drive one of the first tube 110 and the second tube 120 to move longitudinally with respect to the other of the first tube 110 and the second tube 120 according to electronic instructions signals.

Thus, for example, in the embodiment of FIG. 1, the height-adjustable seatpost assembly 48 includes the bicycle telescopic apparatus 58, and manipulation of the telescopic apparatus operating device 98 allows the seat position to be adjusted. The accumulator 234 can include compressible fluid such as an air to apply an upward bias on the second tube 120 when the valve 226 is in an open state. In the height-adjustable seatpost assembly 48, the second tube 120 corresponds to the seatpost 50. Thus, when the valve 226 is in the open state, the rider can adjust the seat by moving upward and downward. Further, release of the telescopic apparatus operating device 98 from the manipulated state can lock the height-adjustable seatpost assembly 48 to prevent telescopic movement.

FIG. 2 further illustrates the bicycle component in block diagram form. The bicycle component 70 can be, for example, the bicycle shifting device 74, which can be a front or rear derailleur, a bicycle shifting operation device that operates the front or rear derailleur, a bicycle suspension 86, which can be a front or rear suspension, or a bicycle drive unit 90, as described further below. Alternatively, the bicycle shifting device 74 can be an internally geared hub. The bicycle shifting device 74 can also be an electrical switch for shifting a derailleur or for shifting an internally geared hub. Thus, the bicycle component 70 can be any of a number of adjustable bicycle components. In the examples of FIGS. 1-3 and 8, the bicycle component 70 is the motorized rear derailleur 78. A component operating device 94 can be electrically coupled to the bicycle component, as shown in FIG. 2. The rider can use the component operating device 94 to send operating signals to the bicycle component 70. Thus, the bicycle component 70 can be controlled by instructions from the rider and by the signal from the output device 154.

Figure 5:
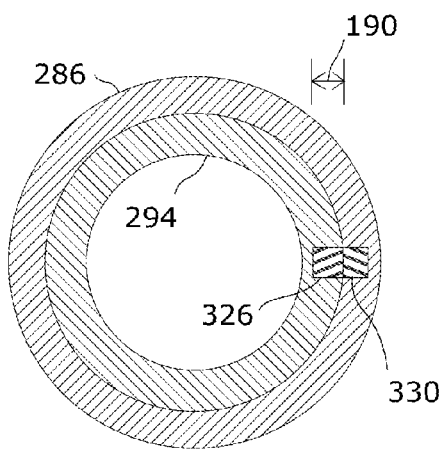
FIG. 5 is a schematic cross sectional diagram taken along the plane 5-5 in FIG. 4.

FIGS. 4 and 5 show another embodiment of a bicycle telescopic apparatus 282. The reference numbers used in the description of FIG. 3 and subsequent embodiments may be the same or similar to those used in the description of FIGS. 1-3 if to identify parts that are the same or similar to those described in connection with the embodiment of FIGS. 1-3.

The embodiment of FIGS. 4 and 5 is generally similar to that of FIGS. 1-3 except for the arrangement of parts. FIG. 4 shows the bicycle telescopic apparatus 282 that includes a first tube 286, which has a receiving space 290, and a second tube 294, which is telescopically received in the receiving space 290 of the first tube 286. A seal 298 is fitted to an outer surface 302 of the second tube 294. A position detector 306 is configured to detect the relative position between the first tube 286 and the second tube 294 in the longitudinal direction of the bicycle telescopic apparatus 282, which is defined by a longitudinal center axis 314. A detecting point 318 of the position detector 306 is located in the receiving space 290 of the first tube 286. As in the embodiment of FIG. 2, the bicycle telescopic apparatus 282 of FIG. 4 includes the output device 154 configured to output a signal based on a detecting result of a position detector 306.

Referring to FIG. 4, the position detector 306 includes a first detector part and a second detector part. Unlike the embodiment shown in FIG. 2 however, a first detector part 326, which is elongated, is located on the second tube 294, which is the inner one of the first tube 286 and the second tube 294. Specifically, the first detector part 326 is located on an outer surface 302 of the second tube 294. The second detector part 330 is located on the first tube 286, which is the outer one of the first tube 286 and the second tube 294. Specifically, the second detector part 330 is located on an inner surface of the first tube 286. Like the embodiment shown in FIGS. 2 and 3, the first detector part 326 faces the second detector part 330 in the radial direction, as shown in FIG. 5. The first detector part 326 is located in a groove 334 formed in the second tube 294. A detector wire 322 electrically couples the position detector 306 to the output device 154. The position detector 306 is otherwise the same as that described in connection with FIGS. 2 and 3.

Referring to FIG. 4, the output device 154 is located on an end of the second tube 294. The cable port 202 is coupled to the output device 154 for facilitating the connection of the output device 154 to the electrical cable 198 and the bicycle component 70. A positioning structure 346 can be located within the second tube 294. The positioning structure 346 includes hydraulic unit 350, which includes a valve 354 located on a hydraulic line 358 and an accumulator 362. The positioning structure 346 is essentially the same as the positioning structure 218 described in connection with FIG. 2. The telescopic apparatus operating device 98 is mechanically coupled to the valve 354 for operating the positioning structure 346, as described in connection with the embodiment of FIG. 2. As described in connection with FIG. 2, a signal from the output device 154 is configured to control the bicycle component 70, which, in the embodiment of FIG. 4, is a component other than the bicycle telescopic apparatus 282.

Figure 6:
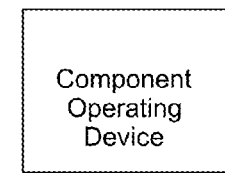
FIG. 6 is a schematic diagram showing selected parts of the bicycle of FIG. 1.
Figure 6:
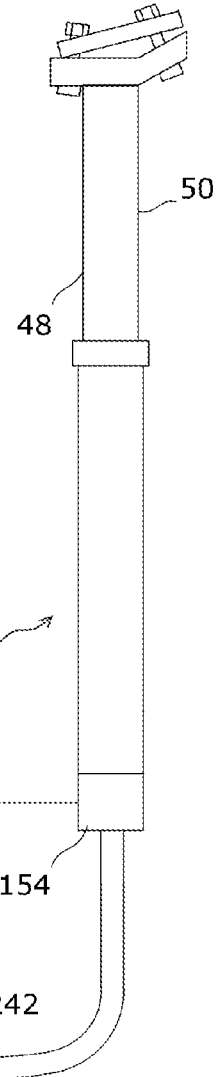

As described above, in the embodiment of FIG. 1, the bicycle telescopic apparatus 58 is the height-adjustable seatpost assembly 48. This is further illustrated schematically in FIG. 6, which shows the bicycle telescopic apparatus 58 incorporated into the height-adjustable seatpost assembly 48. The height-adjustable seatpost assembly 48 is electrically connected to the bicycle component 70, so that the bicycle component 70 can receive the signal concerning the seat position.

Figure 7:
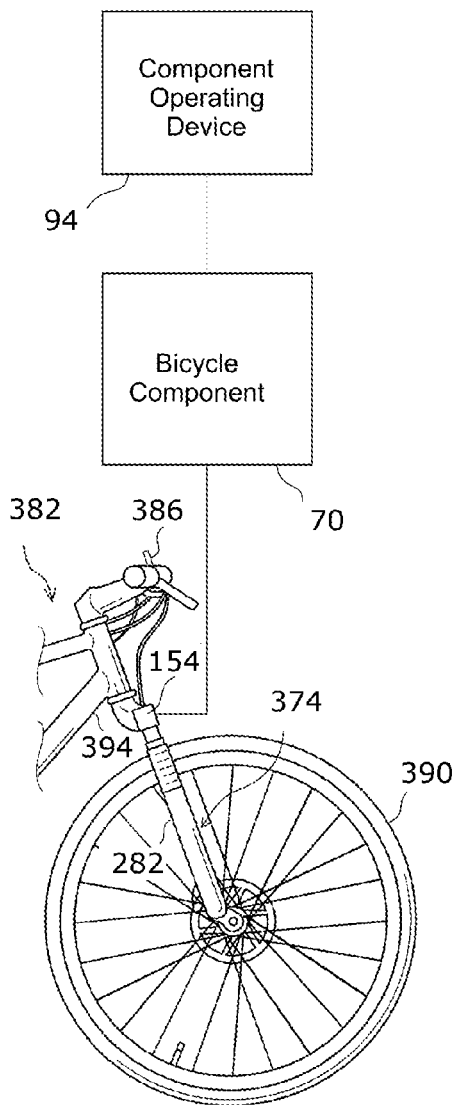
FIG. 7 is a schematic diagram showing selected parts of a bicycle according to a further embodiment.

In a further embodiment schematically illustrated in FIG. 7, the bicycle telescopic apparatus 282 is a suspension apparatus 374. In the embodiment of FIG. 7, the bicycle telescopic apparatus 282 of the embodiment of FIG. 4 is incorporated into the suspension apparatus 374, which, in this embodiment, is a front suspension apparatus of a bicycle 382. The suspension apparatus 374 can also be a rear suspension apparatus (not shown). The suspension apparatus 374 can be selectively locked and unlocked, for example, by operation of the telescopic apparatus operating device 98. Thus, in this embodiment, the telescopic apparatus operating device 98 is a suspension apparatus operating device 386. In one construction, the first tube 286 of the bicycle telescopic apparatus 282 can correspond to a part of the suspension apparatus 374 that is fixed to a front wheel 390, and the second tube 294 can correspond to a part of the suspension apparatus 374 that is fixed to a frame 394 of the bicycle 382. In the embodiment of FIG. 7, the output device 154 of the bicycle telescopic apparatus 282 is connected to the bicycle component 70. Thus, for example, in an embodiment in which the bicycle component 70 is a shifting device, the shifting device can change a gear ratio according to the signal issued by the output device 154. Thus, the bicycle component 70, or shifting device, can be programmed to shift up or down to change a gear ratio according to the detected position of the suspension apparatus 374. This is described further below in connection with FIG. 8.

Figure 8:
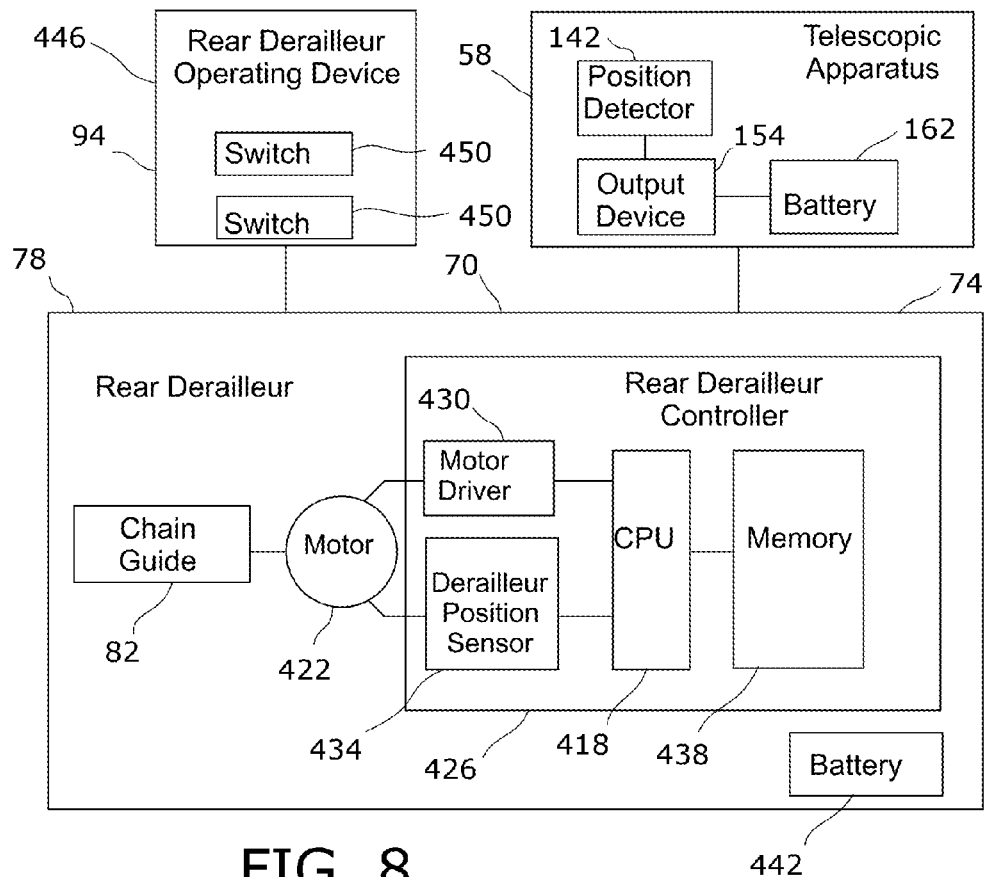
FIG. 8 is a schematic block diagram showing selected parts of the embodiment of FIG. 1.
Figure 9:
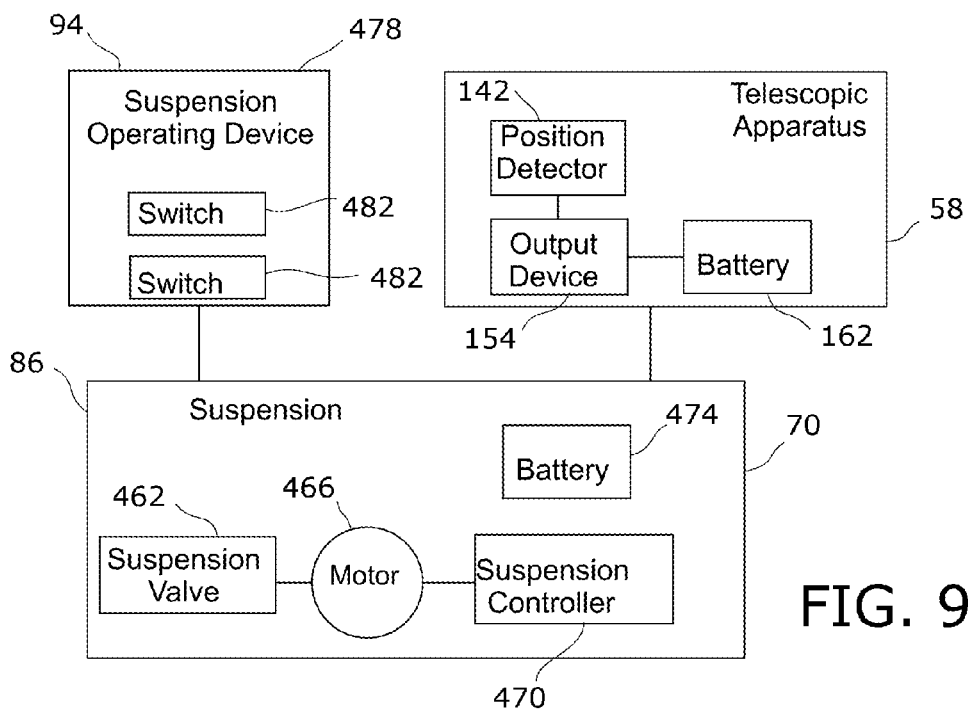
FIG. 9 is a schematic block diagram showing selected parts of a further embodiment.
Figure 10:
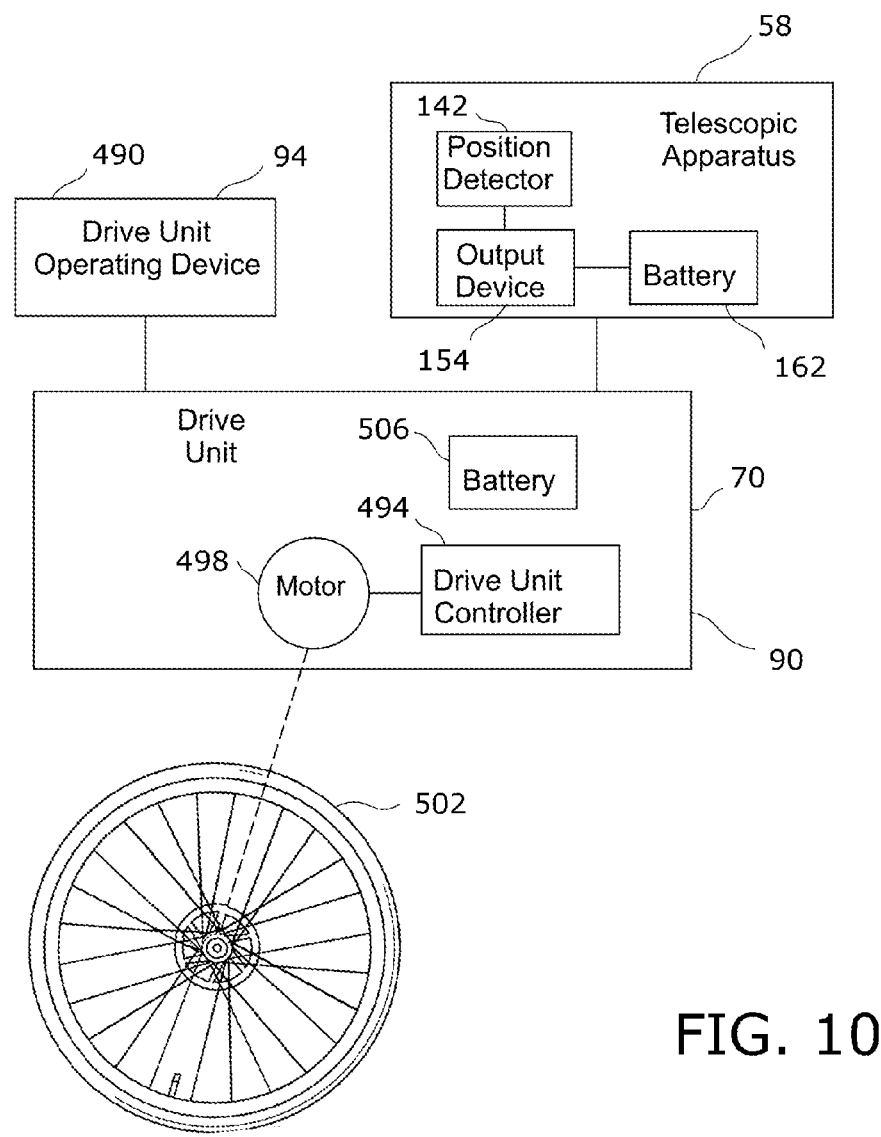
FIG. 10 is a schematic block diagram showing selected parts of a further embodiment.

Referring to FIGS. 8-10, the bicycle component 70 includes at least one of the bicycle suspension 86, the bicycle drive unit 90 and the bicycle shifting device 74. FIG. 8 schematically illustrates the bicycle shifting device 74. In the embodiment of FIG. 8, the bicycle shifting device 74 can be the motorized rear derailleur 78; however, the bicycle shifting device 74 can be any of several types of shifting device. For example, the bicycle shifting device 74 can be a front derailleur or an internally-geared transmission hub or an electric switch for shifting a motorized derailleur or an internally-geared transmission hub. Referring to FIG. 8, a motor 422 is mechanically coupled to the chain guide 82 to position the chain guide 82 according to instructions from a rear derailleur controller 426. The rear derailleur controller 426 includes a motor driver 430 and a derailleur position sensor 434, which are connected to the motor 422. The motor driver 430 and the derailleur position sensor 434 are connected to a CPU 418, which runs programs stored, along with other information, in a memory 438. The rear derailleur 78 can be powered, for example, by a battery 442. The battery 442 can be integrally provided with the rear derailleur 78 or separately provided from the rear derailleur 78.

Referring again to FIG. 8, in this embodiment, the component operating device 94 is a rear derailleur operating device 446, which includes at least one switch for producing command signals to control the motorized rear derailleur 78. The output device 154 of the bicycle telescopic apparatus 58, 282 is electrically coupled to the rear derailleur controller 426 so that the signal concerning the position of the bicycle telescopic apparatus 58, 282 can be used to control the shifting device 74, or the motorized rear derailleur 78 in this embodiment. For example, in the embodiment of FIG. 6, in which the bicycle telescopic apparatus 58, 282 is incorporated into the height-adjustable seatpost assembly 48, when the rear derailleur controller 426 determines that the seat 54 is in a lowered position, the rear derailleur controller 426 can be programmed to shift to a higher gear ratio. In the same manner, when the rear derailleur controller 426 determines that the seat 54 is in a raised position, the rear derailleur controller 426 can be programmed to shift to a lower gear ratio.

FIG. 9 schematically illustrates a further embodiment in which the bicycle component 70 is the bicycle suspension 86. The bicycle suspension 86 can be a front suspension or a rear suspension. Referring to FIG. 9, the bicycle suspension 86 includes a suspension valve 462, which can be, for example, a hydraulic valve or a pneumatic valve to change the behavior characteristics of the bicycle suspension 86. The suspension valve 462 can be actuated by a motor 466, for example, and the motor 466 is controlled by a suspension controller 470. The output device 154 is electrically coupled to the suspension controller 470. The bicycle suspension 86 can be powered by a battery 474, for example. The battery 474 can be integrally provided with the bicycle suspension 86 or separately provided from the bicycle suspension 86. The bicycle suspension 86 is electrically coupled to a suspension operating device 478. In other words, in this embodiment, the component operating device 94 is the suspension operating device 478. The suspension operating device 478 includes at least one switch 482 for producing instruction signals to control the bicycle suspension 86. In the embodiment of FIG. 9, the suspension controller 470 can actuate the suspension valve 462 to alter the behavior characteristics of the bicycle suspension 86 in response to the signal from the output device 154. If the rider sets the height of the seat 54 above a certain level when riding uphill or on a level surface, the signal from the output device 154 will indicate that the seat 54 is above the certain level. A program stored in the suspension controller 470 can, in response, instruct the suspension valve 462 to lock the bicycle suspension 86, for example. If the rider sets the height of the seat 54 below a certain level when riding downhill, the signal from the output device 154 will indicate that the seat 54 is below the certain level. A program stored in the suspension controller 470 can, in response, instruct the suspension valve 462 to increase the damping of the bicycle suspension 86.

FIG. 10 schematically illustrates a further embodiment in which the bicycle component 70 is the bicycle drive unit 90. A drive unit operating device 490 is electrically coupled to the drive unit 90. The drive unit operating device 490 allows the rider to issue command signals to a drive unit controller 494. The drive unit controller 494 controls a motor 498 of the drive unit 90, which drives a bicycle wheel 502. The drive unit 90 can be powered by, for example, a battery 506. The bicycle drive unit also is electrically coupled to the output device 154 so that the drive unit controller 494 can receive the signal from the position detector 142, 306 of the telescopic apparatus 58, 282. Thus, the drive unit controller 494 can change the speed of the motor 498 in response to a signal indicating that the seat 54 is above a certain height, for example.

Figure 11:
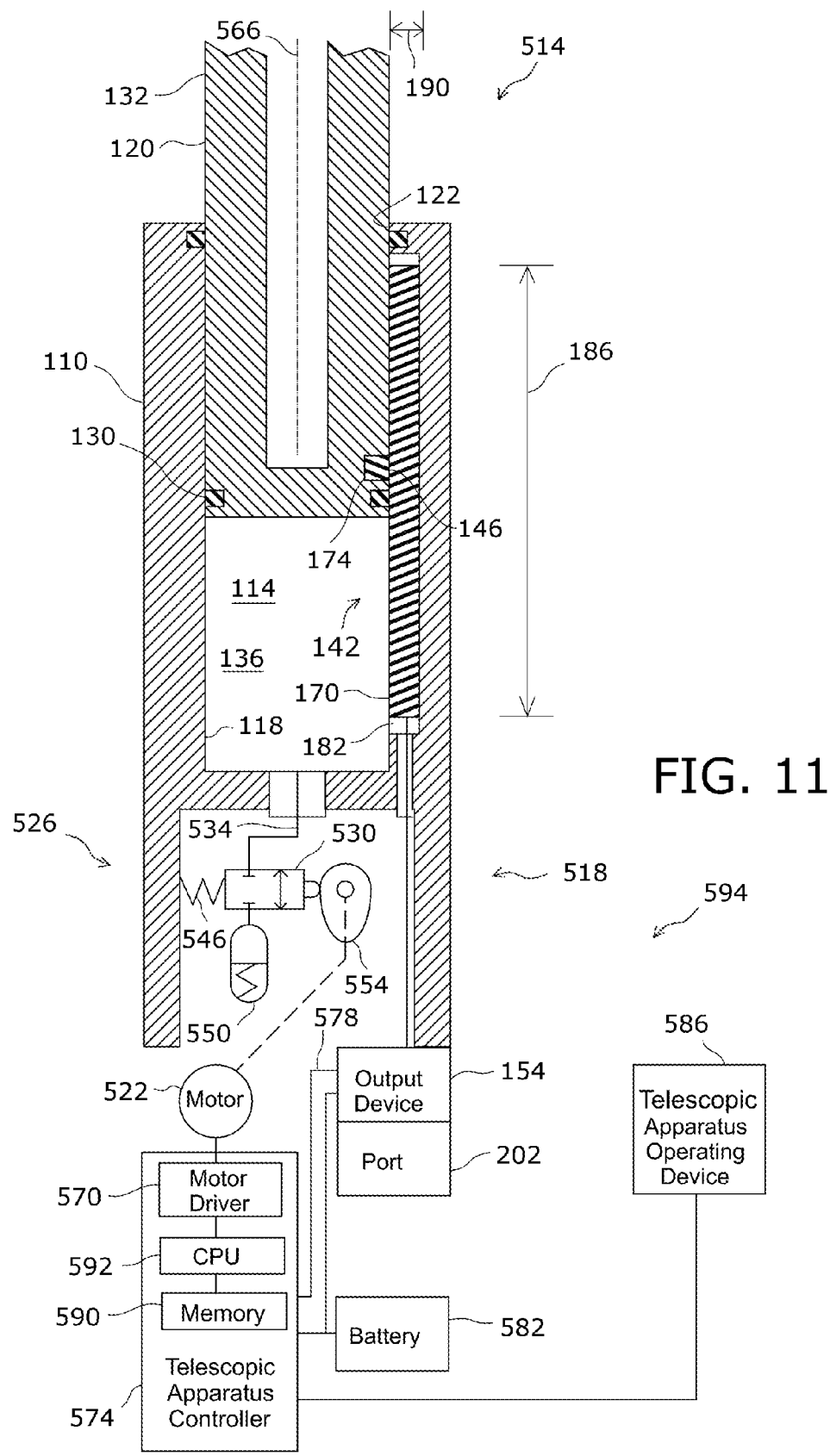
FIG. 11 is a schematic diagram of a bicycle telescopic apparatus and a telescopic apparatus control system according to a further embodiment.

FIG. 11 shows a further embodiment, which is similar to the embodiment of FIG. 2. A cross sectional view of the embodiment of FIG. 11 is essentially the same as that shown in FIG. 3. Referring to FIG. 11, a bicycle telescopic apparatus 514 can include a positioning structure 518 configured to relatively position the first tube 110 and the second tube 120, wherein the output device 154 is configured to output the signal to control the positioning structure 518. The differences between the embodiment of FIG. 11 and the embodiment of FIG. 2 will be described below.

Referring to FIG. 11, the positioning structure 518 includes a motor 522 and a hydraulic unit 526 including a valve 530 to switch between an open state and a closed state of the hydraulic unit 526, and the motor 522 is configured to actuate the valve 530 in accordance with the signal. As shown in FIG. 11, the valve 530 can be biased by a valve spring 546 toward a cam 554. When the cam 554 rotates, the valve 530 moves between the open state and the closed state. The positioning structure 518 can further include an accumulator 550, which can communicate through a hydraulic line 534 with a chamber 136 when the valve 530 is in the open state. The chamber 136 and the accumulator 550 can contain an incompressible fluid such as hydraulic fluid. When the valve 530 is in the closed state, the bicycle telescopic apparatus 514 is locked. When the valve 530 is in the open state, the first tube 110 and the second tube 120 can move relative to one another in the longitudinal direction, which is defined by a longitudinal center axis 566. Such longitudinal movement changes the position detected by the position detector 142. The cam 554 is driven by the motor 522, which can be driven by a motor driver 570. A controller 574 can control the motor 522. The controller 574 is configured to control the positioning structure 518 to relatively position the first tube 110 and the second tube 120 of the bicycle telescopic apparatus 514 in accordance with the signal. The controller 574 can be electrically coupled to the output device 154 by a feedback wire 578, as shown in FIG. 11. Therefore, the feedback wire 578 transmits information indicating the relative position of the first tube 110 and the second tube 120 to the controller 574. The controller 574 and the motor 522 are powered, for example, by a battery 582.

In addition, referring to FIG. 11, an electronic telescopic apparatus operating device 586 can be electrically coupled to the controller 574. The electronic telescopic apparatus operating device 586 allows the rider to send instruction signals to the controller 574 for controlling the telescopic apparatus 514. Alternatively, the operating device 586 can include a sensor that detects, for example, the speed of a bicycle, the inclination of the road, or the rotation speed of the bicycle crank. In such a configuration, the operating device 586 can output a signal to change the height of the telescopic apparatus based on the detected information by the sensor of the operating device 586. Thus, for example, in the case that the telescopic apparatus is incorporated into a height-adjustable seatpost assembly, the telescopic apparatus operating device 586 can send a signal to the controller 574 indicating a seat height at which the telescopic apparatus 514 should be locked. The output device 154 sends the signal to the controller 574 indicating the position of the first tube 110 relative to the second tube 120. The controller 574 can store a program in a memory 590 for determining when to send an instruction to the motor 522 to lock the telescopic apparatus 514 based on the instruction signal from the telescopic apparatus operating device 586 and the signal from the output device 154 indicating the current seat position. A CPU 592 can execute programs stored in the memory 590 to control the telescopic apparatus 514.

Thus, FIG. 11 schematically illustrates a bicycle telescopic apparatus control system 594 that includes the controller 574 configured to control a positioning structure 518 to relatively position a first tube 110 and a second tube 120 of a bicycle telescopic apparatus 514 in accordance with the signal. As described above, the signal includes information related to a relative position of the first tube 110 and the second tube 120 in a longitudinal direction of the bicycle telescopic apparatus 514. Further, the bicycle telescopic apparatus control system 594 includes a position detector 142 including the first detector part 170 and the second detector part 174. The first detector part 170 is located on one of the first tube 110 and the second tube 120, and the second detector part 174 is located on the other of the first tube 110 and the second tube 120. One of the first detector part 170 and the second detector part 174 has a longitudinal maximum length 186 and a transverse maximum length 190 that is smaller than the longitudinal maximum length 186. The longitudinal maximum length 186 is measured along the longitudinal direction of the bicycle telescopic apparatus 514. The transverse maximum length 190 is measured along a transverse direction perpendicular to the longitudinal direction.

Figure 12:
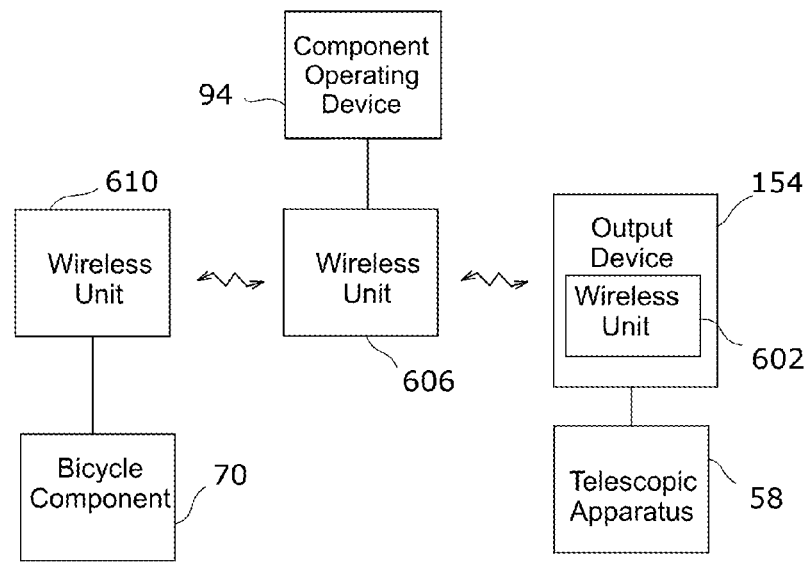
FIG. 12 is a schematic block diagram of selected components of a bicycle according to further embodiment.
Figure 13:
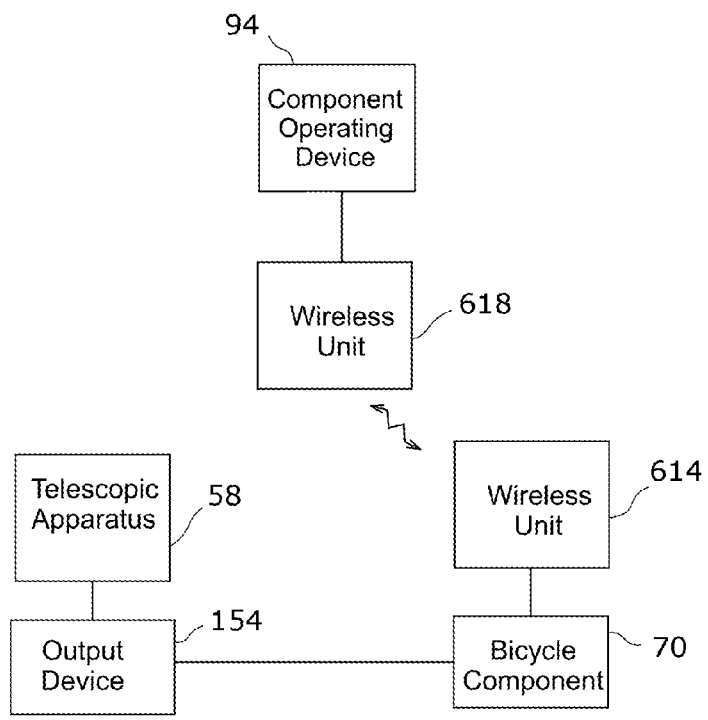
FIG. 13 is a schematic block diagram of selected components of a bicycle according to a further embodiment.

FIGS. 12 and 13 schematically illustrate two different embodiments, respectively, of arrangements between wired and wireless components of a bicycle. Although wires are schematically indicated in the diagrams of FIGS. 2, 4, 6 and 7-11, signals can be sent not only by wires but wirelessly using known wireless equipment and protocols between any of the various electronic parts. In the embodiment of FIG. 12, the output device 154 includes a wireless unit 602 configured to wirelessly output the signal. Thus, the wireless signal includes the position detection information from the position detector 142. In the embodiment of FIG. 12, wireless communication is performed between a wireless unit 606 wired to the component operating device 94, a wireless unit 610 wired to the bicycle component 70, and the wireless unit 602 included in the output device 154. In the embodiment of FIG. 13, wireless communication is performed between a wireless unit 614 wired to the bicycle component 70 and a wireless unit 618 wired to the component operating device 94. In FIG. 13, the output device 154 is wired to the bicycle component 70.

Figure 14:
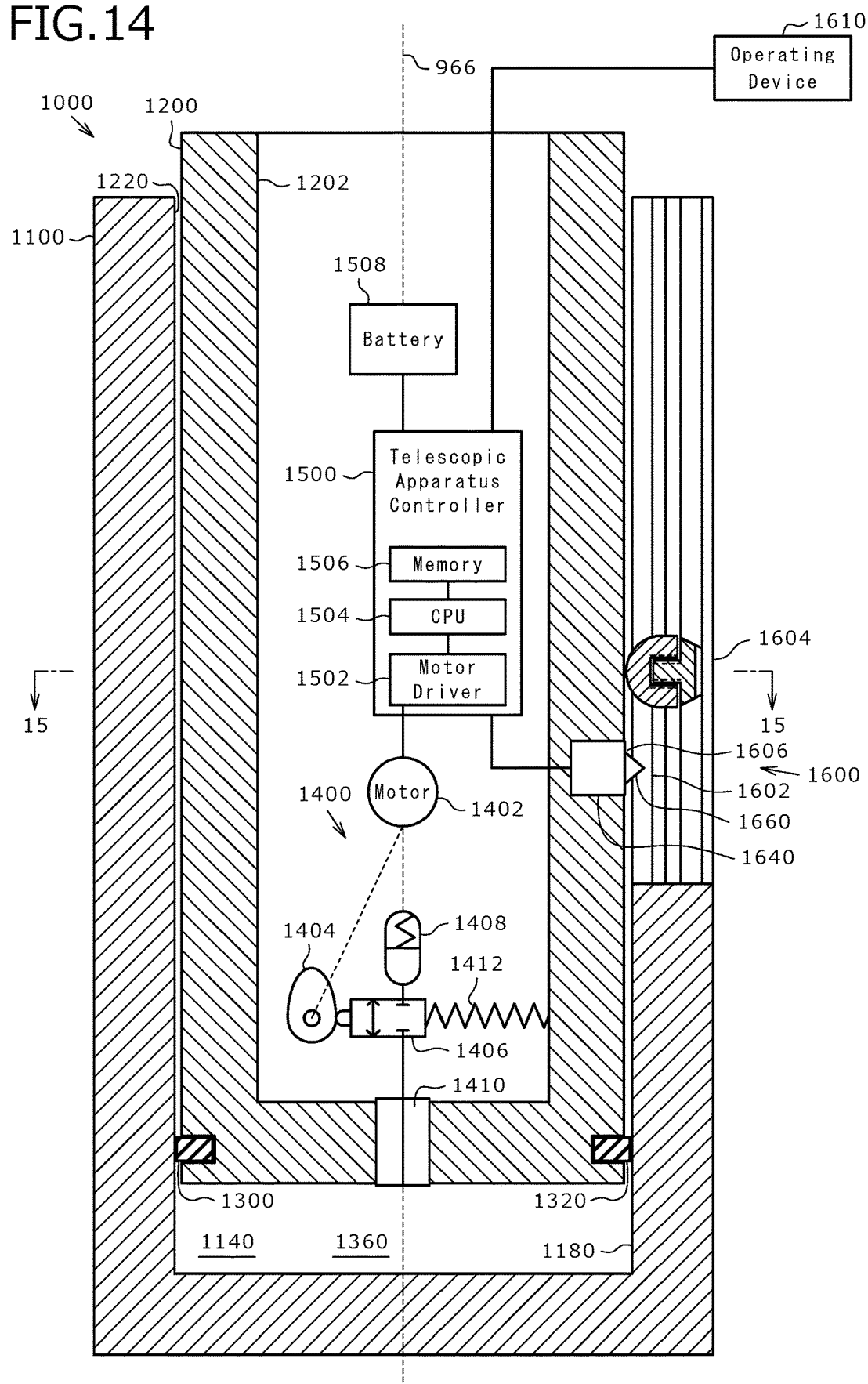
FIG. 14 is a side elevation view of a bicycle according to another embodiment of the present invention.

FIG. 14 schematically illustrates another embodiment of the bicycle telescopic apparatus. In this embodiment, bicycle telescopic apparatus 1000 includes a first tube 1100 and second tube 1200 which is telescopically received in a receiving space 1140 of the first tube 1100. The first tube 1100 has a proximal end and a distal end, which is opposite to the proximal end in a longitudinal direction of the first tube 1100. The distal end of the first tube 1100 is a lower end when the second tube 1200 is received in the first tube 1100. As an example, the distal end of the first tube is a lower end when the height-adjustable seatpost assembly 48 is received in the seat tube 46. The first tube 1100 has a receiving opening 1220 into which the second tube 1200 is inserted during assembly, and an inner surface 1180. The receiving opening 1220 is located at the proximal end of the first tube 1100. The first tube 1100 and the second tube 1200 can slide relative to one another in a longitudinal, or axial, direction, which is defined by longitudinal center axis 966. Thus, the first tube 1100 functions as a cylinder and the second tube 1200 functions as a piston. However, in some embodiments, the first tube 1100 and the second tube 1200 cannot slide relative to one another unless the bicycle telescopic apparatus 1000 is in an unlocked state. Depending on the application, one of the first tube 1100 and the second tube 1200 can be fixed with respect to the frame 18. The first tube 1100 and the second tube 1200 are preferably made of rigid material such as steel or aluminum alloy, or carbon fiber reinforced material.

A seal 1300 is fitted to an outer surface 1320 of the second tube 1200. A chamber 1360 is formed in the receiving space 1140 between the first tube 1100 and the second tube 1200, and the chamber 1360 is sealed by seal 1300. The seal 1300 is annular and is formed of resilient material such as rubber. Other seals, such as a dust seal, for example can be employed to prevent dust from entering the receiving space 1140.

A hydraulic positioning structure 1400 is configured to adjustably position the first tube 1100 and the second tube 1200 in the longitudinal direction. The hydraulic positioning structure 1400 includes a hydraulic passage 1410 and a hydraulic valve 1406 to open and close the hydraulic passage 1410. The hydraulic positioning structure 1400 further includes an accumulator 1408, and a cam 1404. The bicycle telescopic apparatus includes a motor 1402 that is connected to the cam 1404. The motor 1402 is an example of an electrical actuator configured to actuate the hydraulic positioning structure 1400 to close the hydraulic valve 1406. The cam 1404 is moved by the motor 1402 to actuate the hydraulic valve 1406 between an open state and a closed state. As shown in FIG. 14, the hydraulic valve 1406 can be biased by a valve spring 1412. The motor 1402 is configured to actuate the hydraulic valve 1406 via cam 1404 in accordance to a signal received from at least one of a position detector 1600 (described later) and an operating device 1610 (described later). The cam 1404 is, for example, rotatable in response to a movement of the motor 1402. When cam 1404 rotates, the hydraulic valve 1406 moves between the open state and the closed state. The accumulator 1408 can communicate with chamber 1360 via hydraulic passage 1410. The accumulator 1408 and the chamber 1360 contain an incompressible fluid such as hydraulic fluid. When the hydraulic valve 1406 is in the closed state, the bicycle telescopic apparatus 1000 is locked, accordingly, the second tube 1200 is positioned relative to the first tube 1100 in the longitudinal direction, which is defined by the longitudinal center axis 966. When the hydraulic valve 1406 is in the open state, the first tube 1100 and the second tube 1200 can move relative to one another in the longitudinal direction. The cam 1404 is moved by the motor 1402, which can be driven by a motor driver 1502. The controller 1500 can control the motor 1402. The controller 1500 uses motor driver 1502, CPU 1504, and memory 1506 to assist in controlling motor 1402. Battery 1508 can provide power to either or both the controller 1500 and motor 1402.

The controller 1500 is configured to actuate the hydraulic positioning structure 1400 to close the hydraulic valve 1406 in accordance with a closing signal from a position detector 1600. The position detector 1600 is configured to output the closing signal in response to a telescopic movement of the second tube 1200 toward a predetermined position relative to the first tube 1100.

The position detector 1600 includes a first detector part 1602 and a second detector part 1604. For illustrative purposes only, first detector part 1602 is located on the second tube 1200, and second detector part 1604 is located on the first tube 1100. It should be noted that the first detector part 1602 could be located on the first tube 1100, and the second detector part 1604 could be located on second tube 1200.

As shown in FIG. 14, first detector part 1602 is a switch configured to output the closing signal. Second detector part 1604 is configured to actuate the switch. Specifically, the switch is configured to be engaged with the second detector part 1604 to output the closing signal.

Further as shown in FIG. 14, a detecting point 1606 of the position detector 1600 which is defined between the first detector part 1602 and the second detector part 1604 is located in the receiving space 1140. While the first detector part 1602 and the second detector part 1604 are shown attached to the bicycle telescopic apparatus 1000, at least one of the first detector part 1602 and the second detector part 1604 is detachable from the bicycle telescopic apparatus 1000 as well. While it is shown that first detector part 1602 is located on the second tube 1200 and the second detector part 1604 is located on the first tube 1100, it can be appreciated by skilled artisans that the first detector part 1602 could be located on the first tube 1100 and the second detector part 1604 be located on the second tube 1200.

Alternatively or additionally to the detachable structure of the at least one of the first detector part 1602 and the second detector part 1602, the position detector 1600 is configured to be selectively changed between an activated state, in which the position detector 1600 is capable of outputting the closing signal and an inactivated state, in which the position detector 1600 is incapable of outputting the closing signal. The activated state and the inactivated state is achieved by movement of a contact portion 1850 (described later) of the position detector 1600 in a radial direction of the longitudinal center axis 966. In the activated state, the contact portion 1850 is contactable to the switch in response to a telescopic movement of the second tube 1200 toward a predetermined position relative to the first tube 1100 so as to output the closing signal. In the inactivated state, the contact portion 1850 is not contactable to the switch even if the second tube 1200 reaches the predetermined position, since the contact position 1850 is positioned away from the switch in the radial direction. Accordingly, in the inactivated state, the position detector 1600 is not able to output the closing signal.

Alternatively or additionally to the physical switching of the contact portion 1850 described above, the activated state and the inactivated state can be switched by software setting of one of the position detector 1600 and the controller 1500. In such an example, in the inactivated state, the position detector 1600 does not output the closing signal even if the contact portion 1850 contacts the switch, or the controller 1500 ignores the closing signal from the position detector 1600.

Figure 15:
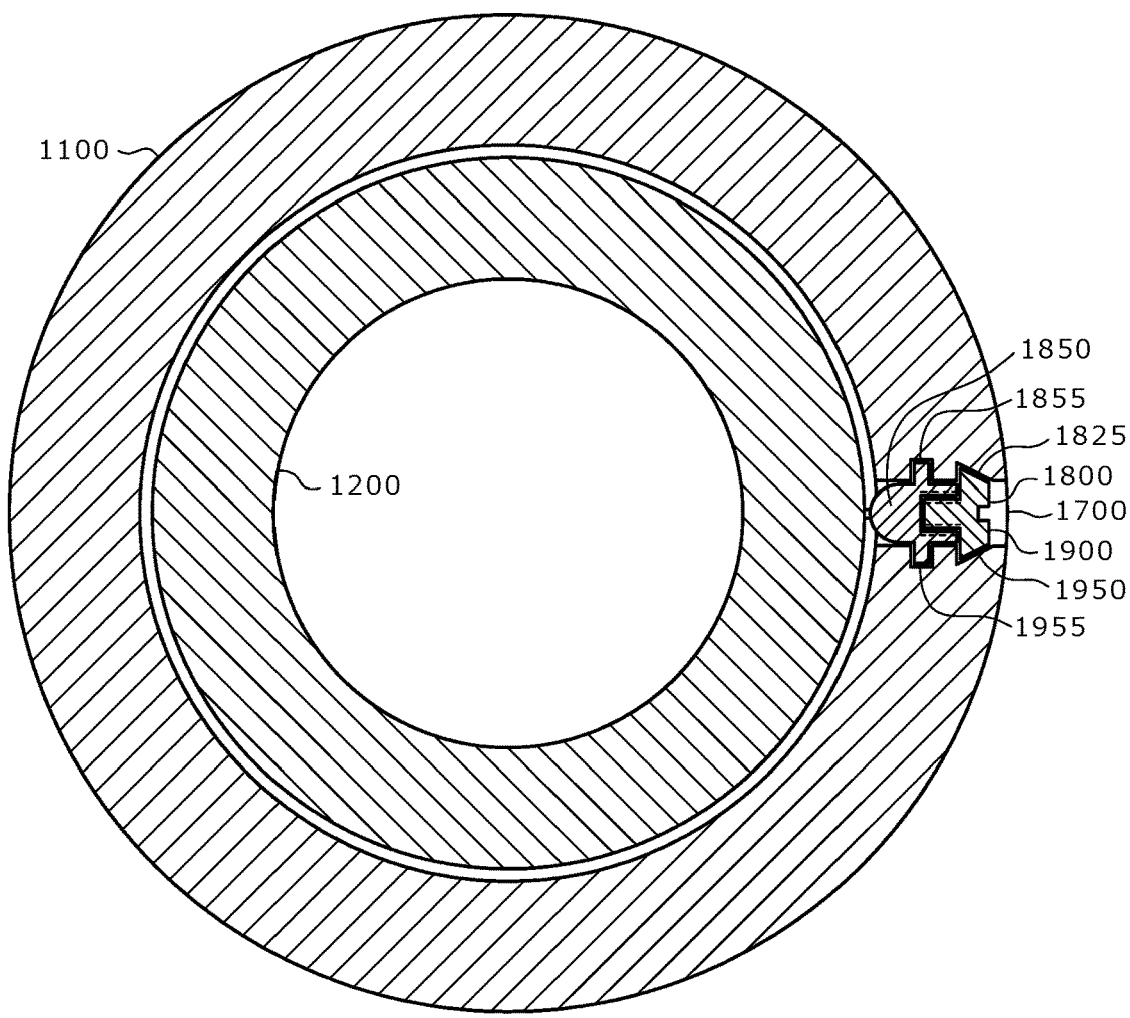
FIG. 15 is a schematic cross sectional diagram taken along the plane 15-15 in FIG. 14.

As illustrated in FIG. 15, the bicycle telescopic apparatus includes an adjustment structure 1700 configured to adjust a longitudinal position of at least one of the first detector part 1602 and the second detector part 1604 of the position detector 1600. For example, adjustment structure 1700 is configured to adjust a longitudinal position of the second detector part 1604. Adjustment structure 1700 achieves adjusting the longitudinal position of the second detector part 1604 by a fixation mechanism 1800 located in a conduit 1900. Of course, other types of instrumentalities are contemplated by the inventors to achieve adjusting at least one of the first detector part 1602 and the second detector part 1604 of the position detector 1600 to selectively be changed in the longitudinal direction. For illustrative purposes, as depicted in FIG. 15, the fixation mechanism 1800 is a set screw 1825 and a contact portion 1850 having at least one projection 1855 and the conduit 1900 includes a groove 1950 shaped to match the head portion of the set screw 1825 and at least one receiver 1955, which can be a recess, to receive the at least one projection 1855. When the set screw 1825 is advanced toward the second tube 1200, the at least one projection 1855 moves away from the second tube 1200 and comes into contact with a portion of the receiver 1955 to provide a clamping force such that the second detector part 1604 becomes fixed in position in the groove 1950 in the longitudinal direction. To readjust the position of the fixation mechanism 1800 in the conduit 1900, the set screw 1825 is moved away from the second tube 1200 so as to have projection 1855 not in contact with the receiver 1955 and then the set screw 1825 is moved into a new position within the groove 1950 and the set screw 1825 is advanced to allow the projection 1855 to contact the receiver 1955 such that the head of the set screw 1825 and the projection 1855 come together to clamp the adjustment structure 1700 into the new position. As also seen in FIG. 15, the adjustment structure 1700 is accessible from outside of the first tube 1100 to adjust the position of the at least one of first detector part 1602 and the second detector part 1604 in the longitudinal direction. In this illustrated embodiment, the adjustment structure 1700 can continuously adjust a longitudinal position of the at least one of the first detector part 1602 and the second detector part 1604 at any position within a predetermined range of the longitudinal direction. However, an adjustment structure can be configured to selectively adjust the at least one of the first detector part 1602 and the second detector part 1604 among plurality of predetermined longitudinal positions.

In operation, when the second detector part 1604 is set into the desired location longitudinally, a user activates the bicycle telescopic apparatus via an operating device 1610 (discussed further below). Manipulation of the operating device 1610 initiates the controller 1500 to activate the hydraulic positioning structure 1400. The hydraulic positioning structure 1400 by using motor 1402 turns the cam 1404 to open valve to allow hydraulic fluid within the accumulator 1408 to pass through the passage 1410 into the chamber 1360. The result is the chamber 1360 fills with hydraulic fluid and raises the second tube 1200 relative to the first tube 1100 in the longitudinal direction.

Additionally, the position detector 1600 becomes active and ready to output a closing signal. The change in position between the first and second tubes 1100 and 1200 continues until the first detector part 1602 contacts the second detector part 1604. This contact is made by contact point 1660 contacting the contact portion 1850. Once contact is made, the closing signal output device 1640 outputs the closing signal to the controller 1500. The controller 1500 activates the motor 1402 to move the cam into a position that allows the spring 1412 to move the hydraulic valve 1406 into a closing position and thus closing the passage 1410 between the chamber 1360 and accumulator 1408. The movement of the second tube 1200 relative to the first tube 1100 stops and the relationship between the tubes becomes fixed due to the incompressibility of the hydraulic fluid. When movement of the second tube 1200 relative to the first tube 1100 is desired again, the user utilizes the operating device 1610 and the operating device 1610 sends a signal to the CPU 1504 to ignore the close signal being sent by the closing signal output device 1640. Thusly, the CPU 1504 sends a signal to the motor driver 1502 which turns on the motor 1502 to rotate the cam 1404 into a position to cause the hydraulic valve 1406 to open and allow fluid communication between the accumulator 1408 and the chamber 1360 which allows hydraulic fluid to pass back into the accumulator 1408 and thus second tube 1200 retreats into first tube 1100.

Figure 16:
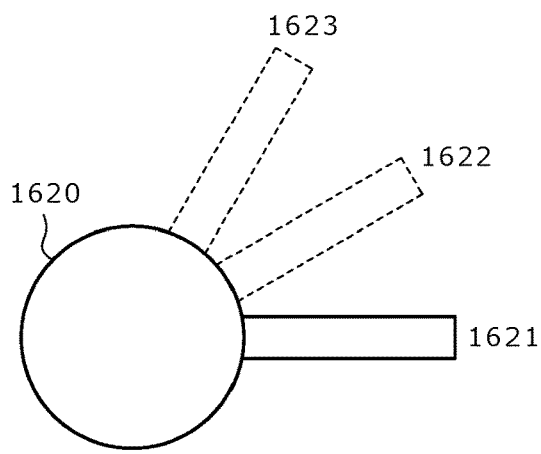
FIG. 16 is a schematic view of a pivot arm.

Turning to FIG. 16, the operating device 1610 is operated by a pivot arm 1620. In position 1, identified with the arm at 1621, the operating device is at a rest state. When the arm pivots to position 2, identified with the arm at 1622, the operating device is in its first state and sends a first opening signal to the controller 1500 to have the hydraulic positioning structure 1400 open the hydraulic valve 1406 and thus second tube 1200 telescopically is movable relative to the first tube 1100. When the contact point 1660 makes contact with the contact portion 1850, the controller 1500 receives the closing signal from closing signal output device 1640 and controls the hydraulic positioning structure 1400 to close the hydraulic passage 1410 via the hydraulic valve 1406 in a state in which the electrical actuator (motor 1402) has opened the hydraulic passage 1410 in accordance with the first opening signal.

When the arm pivots to position 3, identified with the arm at 1623, the operating device 1610 is in its second state and sends a second opening signal to the controller 1500. Even though the position detector 1600 is sending a closing signal, upon receipt of this second opening signal, the CPU 1504 in the controller 1500 ignores the closing signal. Therefore, electric actuator is configured to keep the hydraulic passage 1410 open in a state where the hydraulic passage 1410 has been opened in accordance with the second opening signal.

Figure 17:
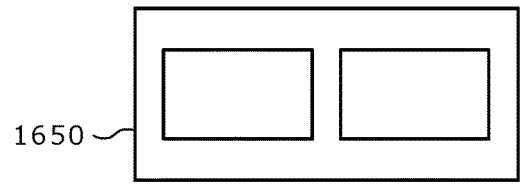
FIG. 17 is a schematic view of a press-button switch.

As shown in FIG. 17, instead of using a pivot arm to operate the operating device 1610, a press-button switch 1650 can be utilized wherein a first button would operate in a similar manner and perform the same function as when the pivot arm would be in its first state. A second button would operate in a similar manner and perform the same function as when the pivot arm would be in its second state, as has been described above when referring to FIG. 16.

While the position detector 1600 is shown as connected to the controller 1500 via an electrical wire, the position detector 1600 can be wirelessly connected to the controller 1500. Therefore the position detector 1600 can wirelessly output the closing signal.

While the telescopic apparatus has been depicted in a hydraulic embodiments, other embodiments are contemplated. Longitudinal movement and positioning of the first and second tubes by a positioning structure can be accomplished by non-hydraulic mechanisms such as mechanical or electrical systems. Through such systems, a positioning detector can be configured to detect a relative position between the first and second tubes by a detecting point located in either the first or second tube. When the first and second tubes reach a predetermined position, the position detector outputs a signal that is related to such a position. A longitudinal position of the position detector can be adjusted to another position by an adjustment structure. The adjustment structure 1700 described above can be adapted to the other embodiments. While the adjustment mechanism has been shown in one embodiment a combination of a set screw and groove, other ways to adjust the position detector are contemplated. For instance, the adjustment mechanism could be another type of mechanical, electrical, or hydraulic mechanism that would also achieve the purpose of adjusting the longitudinal position of the position detector so the predetermined position is selectively changed in the longitudinal direction. In the other embodiment, the signal related to the relative position between the first and second tubes can be used for not only control of the hydraulic positioning structure, but also for control of the other bicycle component, such as a transmission, a derailleur, and a suspension.

In the present application, the following directional terms "forward", "rearward", "left", "right", "upward" and "downward" as well as any other similar directional terms refer to those directions which are determined on the basis of the rider who sits on the seat facing the handlebar 38.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body", and "structure" when used in the singular can have the dual meaning of a single part or a plurality of parts.

The term "configured" as used herein to describe a component, section or part of a device includes hardware and/or software that is constructed and/or programmed to carry out the desired function. The desired function can be carried out by hardware, software, or a combination of hardware and software.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

Finally, terms of degree such as "substantially", "about" and "approximately" as used herein mean a reasonable amount of deviation of the modified term such that the end result is not significantly changed.

While the invention has been described in detail with respect to specific embodiments, those skilled in the art, upon attaining an understanding of the specific embodiments, may readily conceive of alterations, variations, and equivalents to these embodiments. Accordingly, the scope of the invention should be assessed as that of the appended claims and their equivalents.

The invention claimed is:

1. A bicycle telescopic apparatus, comprising:
a first tube having a receiving space;
a second tube telescopically received in the receiving space of the first tube;
a position detector configured to detect a relative position between the first tube and the second tube in a longitudinal direction of the bicycle telescopic apparatus, wherein a detecting point of the position detector is located in the receiving space of the first tube; and
an output device, including circuitry, configured to output a signal based on a detected result of the detector; wherein
the signal is configured to control a bicycle component other than the bicycle telescopic apparatus,
the position detector includes a first detector part and a second detector part,
the first detector part is located on one of the first tube and the second tube,
the second detector part is located on the other of the first tube and the second tube, and
during position detection, the first detector part or the second detector part having a shorter length in the longitudinal direction is configured to directly face the first or the second detector part having a longer length in the longitudinal direction along an entire longitudinal length of the first or the second detector part having the shorter length in the longitudinal direction and a portion of the first or the second detector part having the longer length that is aligned with the first detector part or the second detector part having the shorter length,
at least one of the first detector part and the second detector part is recessed in a groove formed in the first and the second tube, respectively, and
the at least one of the first detector part and the second detector part that is recessed in the groove formed in the first and the second tube is embedded in resin.

2. The bicycle telescopic apparatus according to claim 1, wherein
the second tube includes a seal located on an outer surface of the second tube; and
the second detector part is located between the seal and a receiving opening of the first tube.

3. The bicycle telescopic apparatus according to claim 1, wherein the groove is located on an inner surface of the first tube.

4. The bicycle telescopic apparatus according to claim 1, wherein the bicycle component includes at least one of a bicycle suspension, a bicycle drive unit and a bicycle shifting device.

5. The bicycle telescopic apparatus according to claim 1, wherein the output device is located on an end of the first tube or an end of the second tube.

6. The bicycle telescopic apparatus according to claim 1, wherein the output device includes a wireless unit configured to wirelessly output the signal.

7. The bicycle telescopic apparatus according to claim 1, further comprising at least one of an electrical cable port and an electrical cable, which is configured to be electrically connected to the bicycle component.

8. The bicycle telescopic apparatus according to claim 1, further comprising a positioning structure configured to relatively position the first tube and the second tube, wherein the output device is configured to output the signal to control the positioning structure.

9. The bicycle telescopic apparatus according to claim 8, wherein
the positioning structure includes a motor and a hydraulic unit including a valve to switch between an open state and a closed state of the hydraulic unit, and
the motor is configured to actuate the valve in accordance with the signal.

10. The bicycle telescopic apparatus according to claim 1, wherein
the at least one of the first detector part and the second detector part that is recessed in the groove formed in the first and the second tube is embedded in the resin such that only parts making electrical contact are exposed through the resin.

11. A bicycle telescopic apparatus control system, comprising:
a controller configured to control a positioning structure to relatively position a first tube and a second tube of a bicycle telescopic apparatus in accordance with a signal, which includes information related to a relative position of the first tube and the second tube in a longitudinal direction of the bicycle telescopic apparatus, and
a position detector including a first detector part and a second detector part, wherein
the first detector part is located on one of the first tube and the second tube, and the second detector part is located on the other of the first tube and the second tube,
one of the first detector part and the second detector part has a longitudinal maximum length and a transverse maximum length that is smaller than the longitudinal maximum length,
the longitudinal maximum length is measured along the longitudinal direction of the bicycle telescopic apparatus,
the transverse maximum length is measured along a transverse direction perpendicular to the longitudinal direction,
during position detection, the first detector part or the second detector part having a shorter longitudinal maximum length is configured to directly face the first detector part or the second detector part having a longer longitudinal maximum length along an entire longitudinal length of the first or the second detector part having the shorter longitudinal maximum length and a portion of the first or the second detector part having the longer longitudinal maximum length that is aligned with the first detector part or the second detector part having the shorter longitudinal maximum length, and
at least one of the first detector part and the second detector part is recessed in a groove formed in the first and the second tube, respectively, and
the at least one of the first detector part and the second detector part that is recessed in the groove formed in the first and the second tube is embedded in resin.

* * * * *